(12) United States Patent
Benson et al.

(10) Patent No.: US 12,314,408 B2
(45) Date of Patent: May 27, 2025

(54) EPHEMERAL DATA STORAGE (71) Applicant: Apple Inc., Cupertino, CA (US)

(72) Inventors: Wade Benson, San Jose, CA (US); Anthony J. Chivetta, San Francisco, CA (US); D. J. Capelis, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 182 days.

(21) Appl. No.: 17/805,329

(22) Filed: Jun. 3, 2022

(65) Prior Publication Data

US 2022/0391517 A1 Dec. 8, 2022

Related U.S. Application Data (60) Provisional application No. 63/197,273, filed on Jun. 4, 2021.

(51) Int. Cl.
| | |
|---|---|
| *G06F 21/62* | (2013.01) |
| *G06F 21/31* | (2013.01) |
| *G06F 21/57* | (2013.01) |
| *G06F 21/60* | (2013.01) |
| *G06F 21/78* | (2013.01) |
| *G06F 21/10* | (2013.01) |

(52) U.S. Cl.
CPC ............ *G06F 21/602* (2013.01); *G06F 21/31* (2013.01); *G06F 21/575* (2013.01); *G06F 21/78* (2013.01); *G06F 21/107* (2023.08)

(58) Field of Classification Search
None
See application file for complete search history.

(56) References Cited

U.S. PATENT DOCUMENTS

| | | | |
|---|---|---|---|
| 8,499,359 B1 * | 7/2013 | Blanke | ............... G06F 21/6209 726/32 |
| 8,775,757 B2 | 7/2014 | Polzin et al. | |
| 8,832,465 B2 | 9/2014 | Gulati et al. | |
| 8,873,747 B2 | 10/2014 | Polzin et al. | |
| 9,043,632 B2 | 5/2015 | Machnicki et al. | |
| 9,047,471 B2 | 6/2015 | Polzin et al. | |
| 9,547,778 B1 | 1/2017 | Paaske et al. | |
| 10,079,677 B2 | 9/2018 | Benson et al. | |
| 10,423,804 B2 | 9/2019 | Benson et al. | |
| 10,452,859 B2 | 10/2019 | Tamura et al. | |
| 10,536,271 B1 | 1/2020 | Mensch et al. | |
| 10,839,086 B2 * | 11/2020 | Gross | ............... G11C 16/0416 |
| 11,216,566 B1 * | 1/2022 | Monakhov | ............... G06F 21/78 |

(Continued)

OTHER PUBLICATIONS

IOS Security Guide—White Paper, Apple Inc., Jan. 2018, pp. 1-82.

*Primary Examiner* — Khang Do (74) *Attorney, Agent, or Firm* — Kowert, Hood, Munyon, Rankin & Goetzel, P.C.; Paul T. Seegers; Dean M. Munyon (57) ABSTRACT

Techniques are disclosed relating to securely storing data in a computing system. In some embodiments, a computing system performs a boot sequence that includes generating ephemeral key data and preventing the generated ephemeral key data from being stored in a non-volatile storage including persisting the generated ephemeral key data in the volatile storage. The boot sequence further includes creating, in the non-volatile storage, an ephemeral data volume and encrypting the ephemeral data volume by using the ephemeral key data persisted in the volatile storage.

20 Claims, 6 Drawing Sheets

(56) References Cited

U.S. PATENT DOCUMENTS

| | | | |
|---|---|---|---|
| 2006/0129791 A1* | 6/2006 | Kwon | G06F 21/575 713/1 |
| 2009/0240942 A1* | 9/2009 | Rubio | G06F 21/606 713/171 |
| 2011/0206206 A1* | 8/2011 | Blom | H04L 63/0869 380/279 |
| 2011/0252234 A1 | 10/2011 | De Atley et al. | |
| 2012/0233472 A1* | 9/2012 | Faraboschi | G06F 12/1466 713/193 |
| 2013/0254537 A1* | 9/2013 | Bogorad | H04L 9/0822 713/165 |
| 2014/0258227 A1* | 9/2014 | Muguda | G06Q 10/063 707/624 |
| 2015/0227474 A1* | 8/2015 | Ahlquist | G06F 9/4405 713/193 |
| 2016/0246967 A1* | 8/2016 | Gross | G06F 21/80 |
| 2017/0357817 A1* | 12/2017 | Tamura | G06F 21/602 |
| 2017/0357830 A1* | 12/2017 | Benson | G06F 21/32 |
| 2017/0372074 A1* | 12/2017 | Gunti | G06F 21/575 |
| 2018/0004953 A1* | 1/2018 | Smith, II | H04L 9/3268 |
| 2018/0096151 A1* | 4/2018 | Ghetie | G06F 21/575 |
| 2018/0349608 A1 | 12/2018 | de Cesare et al. | |
| 2018/0357426 A1* | 12/2018 | Pearson | G06F 21/6254 |
| 2019/0188397 A1* | 6/2019 | Benson | G06F 21/12 |
| 2019/0229908 A1* | 7/2019 | Peddada | G06F 21/602 |
| 2020/0226952 A1* | 7/2020 | Lightowler | H04L 9/0637 |
| 2020/0313880 A1* | 10/2020 | Marinet | H04L 9/0861 |
| 2021/0034750 A1* | 2/2021 | Claes | G06F 21/725 |
| 2021/0367769 A1* | 11/2021 | Medaglia | G06F 21/57 |
| 2021/0373903 A1* | 12/2021 | Nelson | G06F 21/572 |
| 2022/0014918 A1* | 1/2022 | Mastenbrook | H04L 9/3242 |
| 2022/0035648 A1* | 2/2022 | Tsirkin | G06F 12/1491 |
| 2022/0121755 A1* | 4/2022 | Motil | H04L 9/0869 |
| 2022/0209944 A1* | 6/2022 | Nix | H04L 9/3263 |
| 2022/0318093 A1* | 10/2022 | Bulusu | G06F 11/0793 |
| 2022/0337582 A1* | 10/2022 | Jogand-Coulomb | G06F 21/606 |

* cited by examiner

EPHEMERAL DATA STORAGE

The present application claims priority to U.S. Prov. Appl. No. 63/197,273, filed Jun. 4, 2021, which is incorporated by reference herein in its entirety.

TECHNICAL FIELD

This disclosure relates generally to computer security and, more specifically, to secure data storage in a computing system.

BACKGROUND

Computer security is often an important consideration when designing and using a computing system. A computing system may, for example, store various sensitive data, which its users may want to keep confidential. The disclosure describes various techniques to improve the security of data stored in a computing system.

DETAILED DESCRIPTION

A computing system may implement various security measures in order to protect itself from malicious behavior. For example, a system's operating system may restrict other processes from accessing sensitive areas of memory and particular system resources. An operating system may also monitor a process's particular function calls and terminate a process's execution if its behavior is deemed inappropriate. A problem with some of these security mechanisms is that they may not be fully enabled until after a computing system completes its boot sequence. For this reason, some computer exploits may rely on a computing system restart/reset in order to thwart these security mechanisms during boot and obtain access to sensitive data stored in the computing system.

The present disclosure describes embodiments in which data is cryptographically protected using key data that is persisted in a volatile storage such that, upon system restart, the key data may be lost preventing access to the protected data. As will be discussed below, in various embodiments, a computing system performs a boot sequence that includes generating ephemeral key data and preventing the generated ephemeral key data from being stored in a non-volatile storage including persisting the generated ephemeral key data in the volatile storage. The computing system creates, in the non-volatile storage, an ephemeral data volume and encrypts the ephemeral data volume by using the ephemeral key data persisted in the volatile storage. If the computing system is then restarted, the volatile storage may lose power causing it to no longer retain the key data, which may inhibit the ability to decrypt data stored in the ephemeral data volume. If a malicious process is behind the restart and trying to gain access to the data in the ephemeral data volume, in various embodiments, the restart actually has the opposite effect and bars the malicious process from accessing the encrypted data in the ephemeral data volume as it destroys the corresponding key data. In some embodiments, when the computing system is restarted, however, it merely recreates the ephemeral data volume—albeit without the encrypted data that it previously held. In some embodiments, the operating system is booted from a separate, non-ephemeral volume persisted across restarts; however, the ephemeral volume may be used to store potentially sensitive data for the operating system or other components.

By protecting data using key data that is stored only in volatile storage, in various embodiments, the computing system may be able to protect data against a restart exploit. Another advantage of being able to store this data in a non-volatile (as opposed to storing this data in a volatile storage) is that a computing system often has larger amounts of available non-volatile storage than amounts of available volatile storage—thus, this approach may help conserve the more limited volatile storage.

Figure 1:
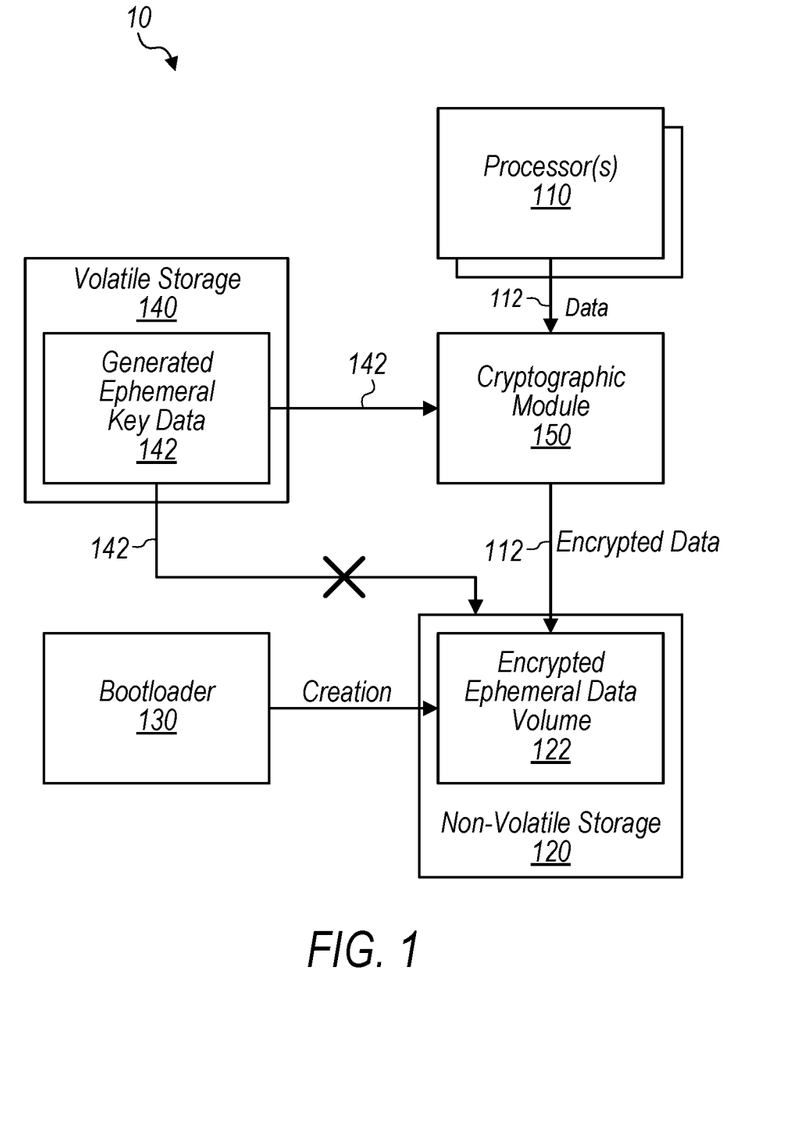
FIG. 1 is a block diagram illustrating an example of a computing system configured to securely store data, according to some embodiments.

Turning now to FIG. 1, a block diagram of a computing system 10 is depicted. In the illustrated embodiment, system 10 includes one or more processors 110, non-volatile storage 120, bootloader 130, volatile storage 140, and a cryptographic module 150. As shown, non-volatile storage 120 includes an encrypted ephemeral data volume 122. Volatile storage 140 includes generated ephemeral key data 142. In some embodiments, system 10 may be implemented differently than shown. For example, bootloader 130 may be located in non-volatile storage 120, more components may be included, etc.

Processors 110, in various embodiments, are processors configured to execute program instructions from one or more computer readable media in order to implement various functionality of system 10. Processors 110 may be central processing unit (CPU) cores within a processor complex such as discussed below with FIG. 6. Processors 110 may include other types of processors such graphic processing units (GPUs), digital signal processors (DSPs), image signal processors (ISPs), etc. As part of implementing various functionality, processors 110 may read and write data 112 stored in non-volatile storage 120 (such as data in data volume 122), which may be encrypted before entering storage 120. Various other components may also use storage 120 (including data volume 122) including hardware components such as other peripherals, network interfaces, input/output devices, etc. and software components such as applications, operating systems, etc.

Non-volatile storage 120 may correspond to any suitable form of non-volatile storage. For example, storage 120 may include a solid-state drive (SSD), hard disk drive (HDD), flash card, flash drive, etc., which may be internal (or external) to system 10 and may be implemented using any of the various non-volatile memories/storages such as those discussed below with FIG. 6. As will be discussed, storage 120 may include one or more data volumes for storing various data, which may include data that system 10 wants to protect. As noted above, some malicious processes may try to obtain access to this data by restarting computing system 10 to exploit system 10 during its boot process when it is potentially more vulnerable. Being non-volatile, however, storage 120 continues to maintain stored data after a restart is performed even though it may no longer be supplied with power.

In various embodiments, however, an ephemeral data volume 122 may be created in storage 120 that maintains data only for the current boot session/cycle (i.e., until computing system 10 is restarted). Although any type of data may be stored in ephemeral data volume 122, volume 122 may, in some embodiments, be particularly suited well for data that can lost without significantly impacting system 10 (or its users). For example, in some embodiments in which computing system 10 implements a web server, system 10 may use ephemeral data volume 122 to store data for active communication sessions between the web server and various clients. In such an embodiment, if system 10 is restarted, this data can be destroyed with minimal impact as new session data may easily be recreated when a client reestablishes a new communication session with the web server. As another example, ephemeral data volume 122 may be used to maintain a swap space/page file for storing virtual memory pages evicted from volatile memory/storage. As yet another example, data volume 122 may be used to store temporarily files such as those created by an installer program, opened email attachments, temporarily created backup files for an application modifying an open file, etc. As will be discussed, in various embodiments, ephemeral data volume 122 is created during a boot sequence of computing system 10 and made ephemeral though the use of key data 142 persisted in volatile storage 140.

Bootloader 130, in various embodiments, is executable to perform a boot sequence of computing system 10, which may include loading of an operating system of system 10 as will be discussed with FIG. 3. As part of performing this boot sequence, bootloader 130 may create data volume 122 so that it is available for use once the boot sequence completes. For example, in some embodiments, bootloader 130 may create volume 122 by writing a volume header, directory and file records, an allocation structure, etc. to non-volatile storage 120. In other embodiments, creation of data volume 122 may be handled by program instructions located elsewhere (such as those within the operating system as will be discussed with FIG. 3), which bootloader 130 may cause to execute during performance of the boot sequence. In some embodiments, bootloader 130 generates key data 142 used to encrypt ephemeral data volume 122. In some embodiments, ephemeral key data 142 includes an ephemeral cryptographic key used to encrypted (and decrypt) ephemeral data volume 122. In some embodiments, ephemeral key data 142 is used to derive a cryptograph key used to encrypt (and decrypt) as will be discussed with FIG. 2 below. Accordingly, the phrase "using something to encrypt" (or decrypt) is used herein to refer to a value used to derive a cryptographic key, a cryptographic key that data is encrypted with, or a cryptographic key that protects another cryptographic that data is encrypted with. In other embodiments, generation of key data 142 may be performed by other software, hardware, or a combination thereof as will be discussed with FIGS. 2 and 4 below, but bootloader 130 may cause generation of key data 142 to be performed during performance of the boot sequence by, for example, providing boot indication, a key generation request, etc. (or causing program instructions to execute that perform these actions).

Volatile storage 140, in various embodiments, is configured to store data while power is maintained to storage 140 but storage 140 loses the ability to store data once power is lost, such as in the event of a system restart. Volatile storage 140 may correspond to any suitable volatile storage/memory such as random access memory (RAM), different levels of caches, registers in various circuits, or any of the other examples given below with respect to FIG. 6. Although shown as a single block in FIG. 1, volatile storage 140 may be a combination of multiple volatile storages (e.g., RAM and one or more registers within circuitry operating on key data 142)—and, in some embodiments, may correspond to all volatile storage in system 10. As discussed above, in various embodiments, computing system 10 prevents generated ephemeral key data 142 from being stored in a non-volatile storage (e.g., storage 120) including persisting the generated ephemeral key data in a volatile storage (e.g., storage 140). In some embodiments, this persisting means that ephemeral key data 142 is stored only in volatile storage 140. For example, key data 142 may be initially be stored in a volatile memory in storage 140 before traveling to a register in a cryptographic circuit using key data 142, but this volatile register may also be considered as a part of storage 140. In some embodiments, this persisting means that only a single instance of ephemeral key 142 is allowed to exist for the entire duration of the boot cycle. For example, a copy of ephemeral key 142 may be read from volatile storage 140 into a local register of a circuit that is not a part of storage 140, but this circuit may destroy this local copy after completing its use of key data 142. As will be discussed below with FIGS. 2-4, in some embodiments, computing system 10 may employ one or more techniques to prevent key data 142 from being stored in non-volatile storage 120. This techniques may be implemented using software (e.g., an operating system that bars read operations to a memory address where key data 142 is located for components that are not cryptographic module 150), hardware (e.g., secure circuitry responsible generating and using key data 142 such that processors 110 never have access to key data 142), or a combination thereof.

Cryptographic module 150, in various embodiments, encrypts data 112 using generated ephemeral key data 142 for storage in encrypted ephemeral data volume 122. Cryptographic module 150 may also decrypt encrypted data 112 read from data volume 122 using key data 142. In some embodiments, cryptographic module 150 may be implemented using software in one or more computer readable media. For example, an operating system running on processors 110 may read key data 142 and use it to encrypt data 112 and decrypt data 112. In some embodiments, cryptographic module 150 may be implemented using hardware. For example, module 150 may include a first cryptographic circuit coupled to volatile storage 140 and configured to read ephemeral key data 142 from volatile storage 140 and derive an ephemeral cryptographic key from ephemeral key data 142, which may be used to encrypt data volume 122. In some embodiments, this first cryptographic circuit may also perform the encryption of data 112. In another embodiment, module 150 may include a second cryptographic circuit that may receive the derived ephemeral cryptographic key from the first cryptographic circuit and encrypt ephemeral data volume 122 using the received ephemeral cryptographic key. As will be discussed in greater detail below with FIGS. 2-4, in some embodiments, cryptographic module 150 may be implemented using a combination of hardware and software.

By persisting key data 142 in volatile storage 140 and preventing it from being stored in non-volatile storage 120, computing system 10 may cause encrypted data 112 in ephemeral data volume 122 to become inaccessible after a system restart/power cycle—thus thwarting any attack attempting to gain access to data 112 via a system restart. Use of non-volatile storage 120 to house volume 122, however, may allow system 10 to conserve space in volatile storage 140, which, in some embodiments, may having a smaller storage capacity than the capacity of non-volatile storage 120.

Figure 2:
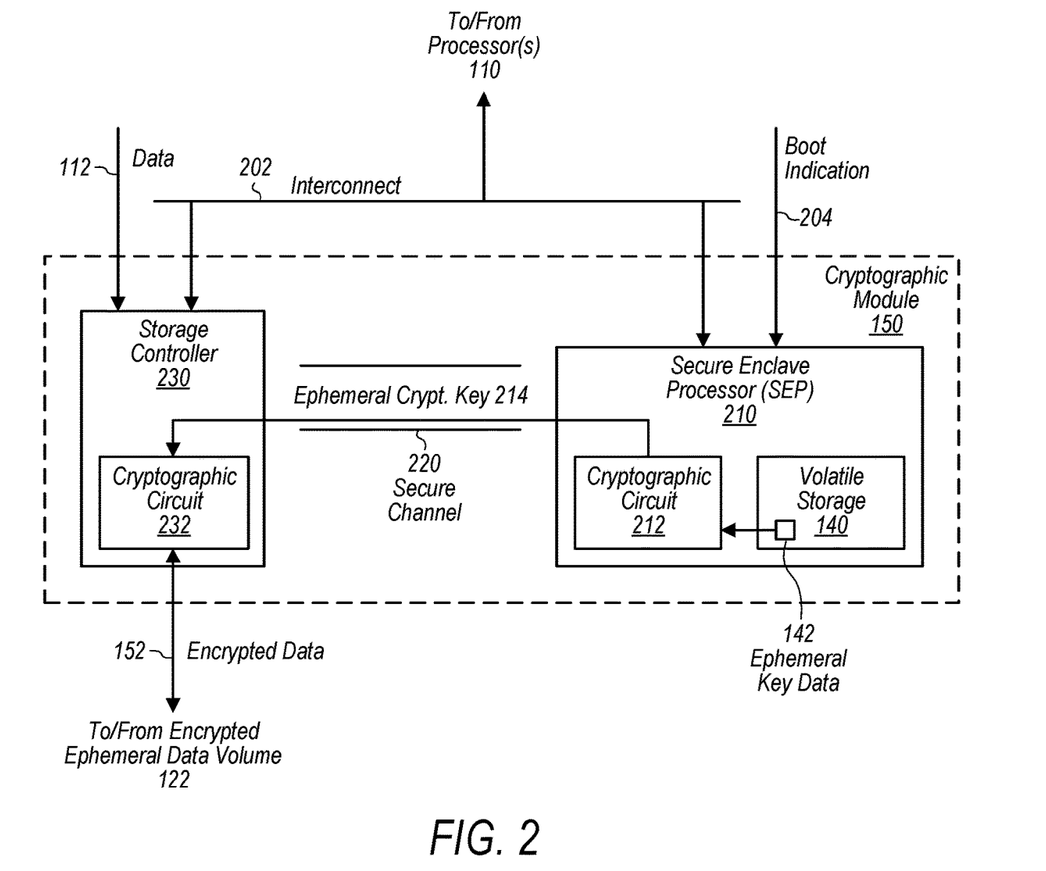
FIG. 2 is a block diagram illustrating an example of a cryptographic module, which may be included in the computing system, according to some embodiments.
Figure 3:
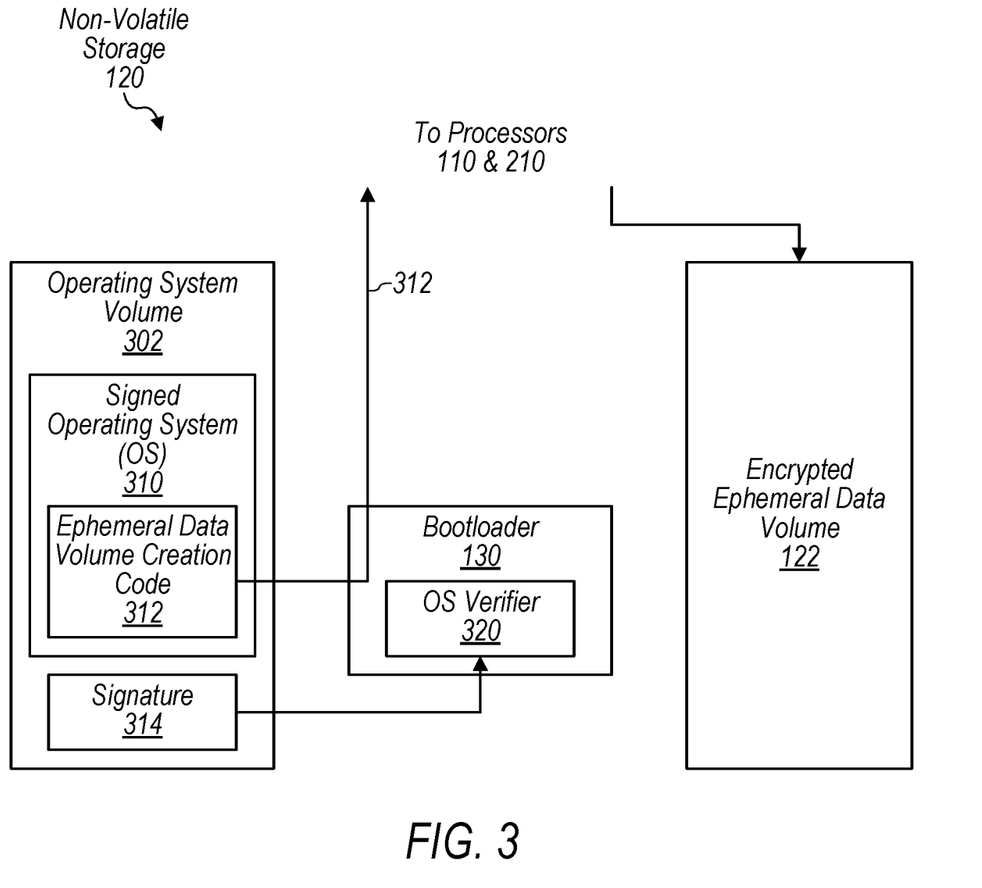
FIG. 3 is a block diagram illustrating an example of a signed operating system executable to facilitate secure storage, according to some embodiments.

Turning now to FIG. 2, a block diagram of cryptographic module 150 is shown. In the illustrated embodiment, cryptographic module 150 includes a secure enclave processor (SEP) 210, which includes a cryptographic circuit 212 and volatile storage 140. Cryptographic module 150 further includes storage controller 230, which includes cryptographic circuit 232. As just discussed, in some embodiments, cryptographic module 150 may be implemented differently than shown such as different hardware and/or software components; volatile storage 140 may also be located elsewhere.

SEP 210, in various embodiments, is a secure circuit configured to perform security sensitive services for computing system 10. As used herein, the term "secure circuit" refers to a circuit that protects an isolated, internal resource from being directly accessed by an external circuit such as processors 110 and other peripherals. This internal resource may be circuitry that performs services/operations associated with sensitive data such as cryptographic circuitry 212 configured to perform encryption and decryption, key derivation, etc. This internal resource may be memory that stores sensitive data such as a supplied user credential, cryptographic keys, etc. Additionally, in some cases, a secure circuit may be said to be "tamper-resistant," which is a term of art referring to mechanisms that prevent compromise of the portions of the secure circuit that perform the one or more services. Accordingly, as shown in some embodiments, SEP 210 stores ephemeral key data 142 in volatile storage 140, which may be internal to SEP 210. As will be described below with respect to FIG. 4, SEP 210 may employ one or more techniques to prevent generated ephemeral key data 142 from being stored in non-volatile storage 120 such as the use of a filter, mailbox, secure program instructions, etc. In some embodiments, SEP 210 generates key data 142 internally to prevent key data 142 from being externally exposed. In the illustrated embodiment, this generation may be performed by cryptographic circuit 212, which may include a random number generator (RNG) circuit to generate a random number for use as key data 142. In some embodiments, circuit 212 may combine this random number with one or more additional components to produce key data 142. In some embodiments, cryptographic circuit 212 also reads ephemeral key data 142 from volatile storage 140 and derives an ephemeral cryptographic key 214 from ephemeral key data 142. Accordingly, circuit 212 may include circuitry (e.g., adders, multipliers, registers, or other logic) to apply a key derivation function to key data 142 to derive key 214. In one embodiment, cryptographic circuit 212 derives key 214 by performing an application of Advanced Encryption Standard (AES) to key data 142 to generate key 214. In some embodiments, circuit 212 may derive one or more additional keys from the ephemeral key data 142. These additional keys may be used, for example, to encrypt data stored elsewhere in system 10, secure communications between peripherals in system 10 such as biosensor and SEP 210, authentication keys used to authenticate with one or more other computing systems, etc. In various embodiments, SEP 210 may generate key data 142 and/or derive key 214 in response to an indication 204 that system 10 is being booted and access to key 214 for protecting data volume 122 is desired. This indication may come from bootloader 130 executing on processors 110 or some other source.

In various embodiments, SEP 210 is one of a class of circuits that is configured to perform one or more services and return an authenticated response. A result returned by SEP 210 is considered to have an indicia of trust exceeding that of a circuit that merely returns a result without any form of authentication. In some embodiments, responses from SEP 210 are authenticated through the use of cryptography such as providing a digital signature or encrypted data. Accordingly, in the illustrated embodiment, SEP 210 provides ephemeral cryptographic key 214 via a secure channel 220 to storage controller 230 to facilitate encryption and decryption of data 112 being written to and read from ephemeral data volume 122. In some embodiments, this secure channel 220 is a dedicated bus between SEP 210 and storage controller 230. In other embodiments, this secure channel 220 uses interconnect 202, but communications, such those including key 214, are encrypted using a cryptographic key shared only by SEP 210 and storage controller 230. In doing so, SEP 210 may prevent processors 110 from ever having access to an unencrypted form of key 214, which processors 110 might attempt to store in storage 120 if, for example, processors 110 were executing malicious/compromised code. Thus, data 112 may be encrypted in data volume 122 without processors 110 receiving key data 142 in some embodiments.

Storage controller 230, in various embodiments, is a controller configured to facilitate accessing data stored in non-volatile storage 120. Controller 230 may generally include circuitry for receiving requests for storage operations from other components of computing system 10 and for accessing storage 120 to service those requests. Accordingly, controller 230 may include circuitry for issuing read and write commands to storage 120, performing logical-to-physical address mapping for data in non-volatile storage 120, etc. In some embodiments, controller 230 includes circuitry configured to handle various physical interfacing (PHY) functionality to drive signals to non-volatile storage 120. In various embodiments, controller 230 is configured to send data read from non-volatile storage 120 over interconnect 202 to various components of computing system 10 such as processors 110. In some embodiments, controller 230 may be configured to implement a direct memory access (DMA) controller that coordinates DMA transactions to exchange information associated with read and write operations over interconnect 202 to other components. Thus, in some embodiments, controller 230 may also be referred to as a DMA controller.

In some embodiments, storage controller 230 includes cryptographic circuitry 232 configured to encrypt data 112 being written to encrypted ephemeral data volume 122, and decrypt encrypted data 112 being read from data volume 122. Cryptographic circuitry 232 may implement any suitable encryption algorithm for encrypting and decryption of data 112 such as Data Encryption Standard (DES), Advanced Encryption Standard (AES), Rivest Shamir Adleman (RSA), etc. As noted above, in the illustrated embodiment, NVM controller 160 encrypts and decrypts data 112 using one or more ephemeral cryptographic keys 214 received via secure channel 220. In response to receiving an ephemeral cryptographic key 214, cryptographic key 232 may store the key 214 in an internal register, which may be a volatile memory. Thus, if system 10 is restarted and power is temporarily lost, this local copy of key 214 may be destroyed. In some embodiments, cryptographic circuitry 232 may also destroy its local copy of key 214 in response to particular events such as a user logging out of system 10, locking system 10, etc., which may require obtaining a new copy of key 214 from SEP 210. In some embodiments, SEP 210 may require performance of a user authentication before granting access to a new copy of key 214.

In some embodiments, actions performed by SEP 210 and storage controller 230 may be initiated by program instructions, which may be stored elsewhere such as in non-volatile storage 120. Some of the potential contents within non-volatile storage 120 will now be discussed Turning now to FIG. 3, a block diagram of contents within non-volatile storage 120 is depicted. In the illustrated embodiment, storage 120 includes an operating system volume 302, bootloader 130, and encrypted ephemeral data volume 122. As shown, volume 302 may include a signed operating system (OS) 310, which may include ephemeral data volume creation code 312, and a corresponding signature 314. Bootloader 130 may also include an OS verifier 320. In some embodiments, storage 120 may be implemented differently than shown. For example, bootloader 130 (or at least a portion) may reside in a separate storage as discussed below, volume 302 may reside in a separate storage, code 312 may be located elsewhere, etc.

OS volume 302, in various embodiments, is a container for OS 310, which may manage various operations of computing system 10 and may include a kernel and drivers for system 10. In the illustrated embodiment, OS volume 302 is distinct from encrypted ephemeral data volume 122. As ephemeral data volume 122 may, in some embodiments, be recreated each time a boot sequence is performed, use of a separate OS volume 302 may provide a way to preserve OS 310 after a restart as OS volume 302 may be preserved across multiple performances of the boot sequence. Thus, the destruction of data volume 122 may not also result in the removal of OS 310 in various embodiments. In various embodiments, however, OS 310 may still generate various data after completion of the boot sequence that gets stored in encrypted ephemeral data volume 122. As noted above, this may include a swap space, temporary files that OS 310 can recreate after a reboot, etc. As shown and discussed more below, OS 310 may be signed by a provider of OS 310 (e.g., a manufacturer of system 10), and a corresponding signature 314 may be stored in volume 302 in order preserve the integrity of OS 310 including ephemeral data volume creation code 312.

Ephemeral data volume creation code 312, in various embodiments, includes program instructions executable to create encrypted data volume 122. For example, code 312 may create a volume header that includes general information about a data volume 122 such as the volume's name, universally unique identifier (UUID), size, creation date, location of particular file system data structures, etc. In some embodiments, this volume header may correspond to the superblock used by UNIX-style file systems (e.g., the Extended Filesystem (EXT)), the volume header in Apple File System (AFS) or $Volume in New Technology File System (NTFS). Code 312 may also provision volume 122 with a file system, which may include file records and directory records. File records may include various information about files in volume 122 such as a node ID, creation and modification dates, file permissions, a name of user creating the file, a file name, etc. In some embodiments, file records may include inodes in EXT, file thread records and file records in the catalog file of AFS, file information in the master file table $MFT of NTFS. Directory records may include various information about the directory structure of the file system. A given directory record may specify, for example, the directory's name, identifiers for parent and child directories, the files included in the directory, creation and modification dates of the directory, permission information, etc. In some embodiments, directory records may include the HTree in EXT, directory records in the catalog file in AFS, or $MFT in NTFS. Code 312 may also create an allocation structure, which may include information identifying which blocks of volume 122 have been allocated for storing data 112 (or which blocks are free to store data). In some embodiments, the allocation structure may correspond to the allocation file in AFS or $Bitmap in NTFS. In some embodiments, code 312 may include program instructions executable by processors 110 and/or SEP 210 to generate key data 142; however, in other embodiments, code 312 may merely cause generation of key data 142 to occur such as by providing an indication 204 to SEP 210, which may cause SEP 210 to execute program instructions stored elsewhere and use dedicated circuitry, such as cryptographic circuit 212, to generate key data 142. In some embodiments, code 312 may include program instructions executable by processors 110 and/or SEP 210 to derive cryptographic key 214 from key data 142; however, in other embodiments, code 312 may merely cause generation of derivation of key 214 to occur such as providing a request/command to SEP 210, which may cause SEP 210 to execute program instructions stored elsewhere and use dedicated circuitry, such as cryptographic circuit 212, to derive key 142 and provide it to storage controller 230, for example. In some embodiments, code 312 may include program instructions for preventing generated ephemeral key data 142 from being stored in non-volatile storage 120. For example, OS 310 may deny any requests from application processes to perform read operations at an address location where key data 142 is stored in volatile storage 140. In some embodiments, the preventing may be implemented by software and/or hardware located elsewhere such as within SEP 210 as will be discussed with FIG. 4.

In various embodiments, bootloader 130 loads OS 310 as part of the boot sequence that it performs. As part of performing this boot sequence, in some embodiments, bootloader 130 verifies the integrity of OS 310 using, for example OS verifier 320. Although depicted in the same storage as OS 310, in some embodiments, the portion of bootloader 130 that includes OS verifier 320 may be stored in a separate read only memory (ROM), which may be previsioned at fabrication. Being in a ROM, this portion of bootloader 130 may not be modifiable (or, at least, not easily modifiable) and thus may be used as the root for establishing trust for other components of system 10 including OS 310. Prior to permitting OS 310 to be executed, OS verifier 320 may verify the integrity of OS 310 in order ensure that it was not, for example, maliciously altered. To perform this verification, OS verifier 320 may read signature 314 and verify the contents of OS 310 against the signature 314 using a public key, which may correspond to a private key of the manufacturer that signed OS 310 to preserve its integrity. If the verification of OS 310 is successful, bootloader 130 may provide code 312 for execution by one or more of processors 110 and 210. In response to the verifying failing, however, bootloader 130 may abort the boot sequence without creating ephemeral data volume 122.

Figure 4:
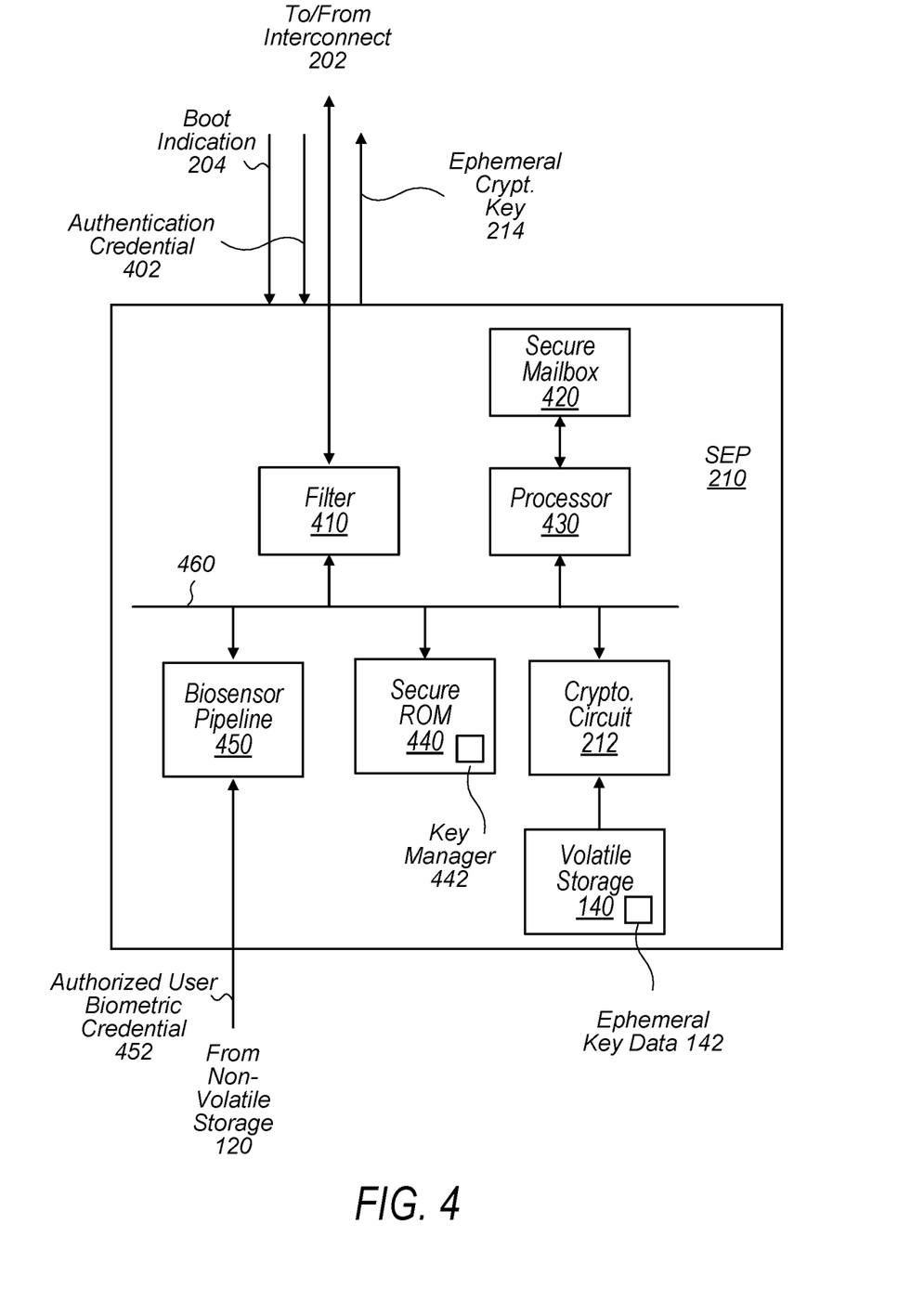
FIG. 4 is a block diagram illustrating an example of a secure enclave processor, which may be included in the computing system, according to some embodiments.

Additional security may be provided by SEP 210 described in greater detail next.

Turning now to FIG. 4, a block diagram of SEP 210 is depicted. In the illustrated embodiment, SEP 210 includes a filter 410, secure mailbox mechanism 420, processor 430, secure ROM 440, cryptographic circuit 212, volatile storage 140, and a biosensor pipeline 450 coupled together via an interconnect 460. In some embodiments, SEP 210 may include more (or less) components than shown in FIG. 4. As noted above, SEP 210 is a secure circuit, which may have tamper resistance. As discussed below, SEP 210 implements tamper resistance through the use of filter 410 and secure mailbox 420.

Filter 410 is circuitry configured to tightly control access to SEP 210 to increase the isolation of the SEP 210 from the rest of computing system 10, and thus the overall security of system 10. More particularly, in some embodiments, filter 410 may permit read/write operations from processors 110 (or other peripherals coupled to interconnect 202 in some embodiments) to enter SEP 210 only if the operations address the secure mailbox 420. Other operations may not progress from the interconnect 202 into SEP 210. Even more particularly, filter 410 may permit write operations to the address assigned to the inbox portion of secure mailbox 420, and read operations to the address assigned to the outbox portion of the secure mailbox 420. All other read/write operations may be prevented/filtered by the filter 410. In some embodiments, filter 410 may respond to other read/write operations with an error. In one embodiment, filter 410 may sink write data associated with a filtered write operation without passing the write data on to local interconnect 460. In one embodiment, filter 410 may supply nonce data as read data for a filtered read operation. Nonce data (e.g., "garbage data") may generally be data that is not associated with the addressed resource within the SEP 210. Filter 410 may supply any data as nonce data (e.g. all zeros, all ones, random data from a random number generator, data programmed into filter 410 to respond as read data, the address of the read transaction, etc.). Thus, filter 410 may prevent direct access to internal components 430-450, 212, and 140 by an external entity such as processors 110.

In various embodiments, filter 410 may only filter incoming read/write operations. Thus, the components of the SEP 210 may have full access to the other components of computing system 10 such as non-volatile storage 120. Accordingly, filter 410 may not filter responses from interconnect 202 that are provided in response to read/write operations issued by SEP 210.

Secure mailbox 420 is circuitry that, in some embodiments, includes an inbox and an outbox. Both the inbox and the outbox may be first-in, first-out buffers (FIFOs) for data. The buffers may have any size (e.g. any number of entries, where each entry is capable of storing data from a read/write operation). Particularly, the inbox may be configured to store write data from write operations sourced from interconnect 202. The outbox may store write data from write operations sourced by processor 430. (As used herein, a "mailbox mechanism" refers to a memory circuit that temporarily stores 1) an input for a secure circuit until it can be retrieved by the circuit and/or 2) an output of a secure circuit until it can be retrieved by an external circuit.)

In some embodiments, software executing on processors 110 (or other peripherals coupled to interconnect 202) may request services of SEP 210 via an application programming interface (API) supported by OS 310—i.e., a requester may make API calls that request services of SEP 210. These calls may cause corresponding requests to be written to mailbox mechanism 420, which are then retrieved from mailbox 420 and analyzed by processor 430 to determine whether it should service the requests. Accordingly, this API may be used to send, via mailbox 420, for example, an authentication credential 402 received based on authentication prompt, such as a biometric credential, a passcode, etc., for verification as well as an indication 204 that SEP 210 is supposed to generate key data 142 and use key data 142 to facilitate encrypting data such as by deriving and providing cryptographic key 214. By isolating SEP 210 in this manner, integrity of SEP 210 may be enhanced—including preventing, for example, a malicious process running on processors 110 from extracting ephemeral key data and storing it in non-volatile storage 120.

SEP processor 430 is configured to process commands received from various sources in computing system 10 and may use various secure peripherals to accomplish the commands. Processor 430 may then execute instructions stored in ROM 440 (or elsewhere such as storage 120) such as key manager 442, which may facilitate generation of key data 142 and derivation of cryptographic key 214. For example, SEP processor 430 may execute key manager 442 to provide appropriate commands to cryptographic circuit 212 to generate key data 142 and derive key 214—and, in some embodiments, provide commands to biosensor sensor pipeline 450 to verify an authentication credential 402 if credential 402 is a biometric credential collected by a biosensor of system 10.

Secure ROM 440 is a memory configured to store program instruction for booting SEP 210. In some embodiments, ROM 440 may respond to only a specific address range assigned to secure ROM 440 on local interconnect 460. The address range may be hardwired, and processor 430 may be hardwired to fetch from the address range at boot in order to boot from secure ROM 440. Filter 410 may filter addresses within the address range assigned to secure ROM 440 (as mentioned above), preventing access to secure ROM 440 from components external to the SEP 210. In some embodiments, secure ROM 440 may include other software executed by SEP processor 430 during use. This software may include the program instructions to process inbox messages and generate outbox messages, etc. In some embodiments, program instructions executed by SEP processor 430 are signed by a trusted authority (e.g., system 10's manufacturer) in order to ensure their integrity. These program instructions may include those stored in secure ROM 440 and program instructions stored externally such as in non-volatile storage 120; however, these externally stored program instructions may have their signatures verified by program instructions in ROM 440 prior to being permitted to be executed by processor 430.

Cryptographic circuit 212 is circuitry configured to perform cryptographic operations for SEP 210, including key generation as well as encryption and decryption using keys, which may be stored in storage 140. Cryptographic circuit 212 may implement any suitable encryption algorithm such as Data Encryption Standard (DES), Advanced Encryption Standard (AES), Rivest Shamir Adleman (RSA), etc. In some embodiments, circuit 212 may further implement elliptic curve cryptography (ECC). As noted above, circuit 212 may be responsible for generating key data 142 and/or using key data 142 to derive key 214. In some embodiments, circuit 212 may generate key data 142 in response to a command from manager 442 and using a random number generator (RNG) circuit, which may be included in circuit 212 or accessible to circuit 212 as a secure peripheral via interconnect 460. In some embodiments, SEP 210 may predicate use of key data 142 on a successful user authentication. Accordingly, prior to a use of ephemeral key data 142, computing system 10 may request an authentication credential 402. In response to receiving the requested authentication credential, SEP 210 (using key manager 442, pipeline 450, or some other component) may verify the authentication credential 402. In response to the verifying being successful, SEP 210 may determine to permit the use of ephemeral key data 142, which may include circuit 212 deriving key 142. As noted above, authentication credential may be a biometric credential, which may be evaluated by pipeline 450 discussed below.

As noted above, volatile storage 140 may include a local memory (i.e., internal memory) of SEP 210 configured to store key data, which may include key data 142 and key 214. In some embodiments, this key data may include keys used to establish the secure channels between SEP 210 and other elements such as storage controller 230 for secure channel 220, a biosensor used by pipeline 450, etc. In some embodiments, storage 140 may be configured such that only cryptographic circuit 212 is able to read and write data to storage 140 including key data 142. For example, while key manager 442 running on processor 430 may be able to request generation of key data 142 and performance of an action with respect to key data 142, processor 430 may not be able to read or write data to storage 140. Thus, if processor 430 were to execute compromised program instructions, processor 430 would be unable to read and write data 142 anyways as storage 140 may, for example, lack the physical read and write interfaces to facilitate such actions for processor 430. In some embodiments, cryptographic circuit 212 may access other forms of storage, which may include other non-volatile storages such as listed below with respect to FIG. 6. In some embodiments, these other storages may also include a set of fuses that are burnt during a fabrication of SEP 210 (or more generally system 10) in order to record keys such as a unique identifier (UID), which may be used derive keys described herein such as key 214 or key data 142 discussed above. In some embodiments, to expand its available storage, SEP 210 may store keys generated by cryptographic circuit 212 externally to SEP 210, such as in non-volatile storage 120, but encrypt those keys using one or more keys stored in storage 140 or other internal storages.

Biosensor sensor pipeline 450, in various embodiments, is circuitry configured to compare an authentication credential 402 if it is biometric credential captured by a biosensor from a user being authenticated with a biometric credential 452 of an authorized user. (In other embodiments, credential 402 and 452 may be compared by software such as key manager 442.) Biometric credentials may be data that uniquely identifies the user among other humans (at least to a high degree of accuracy) based on the user's physical or behavioral characteristics. In some embodiments in which credential 402 is collected from a user's face, pipeline 450 may perform the comparison using a collection of neural networks included in pipeline 450, each network being configured to compare biometric credential 402 captured in a single frame with biometric credential 452 captured in multiple frames for an authorized user. As shown, pipeline 450 may be configured to read, from non-volatile storage 120, biometric credential 452, which may be protected by encryption in some embodiments and/or be stored in an associated part of non-volatile storage 120 that is only accessible to SEP 210. (In another embodiment, SEP 210 may store credential 452 internally.) Based on the comparison of biometric credentials 402 and 452, pipeline 450 may provide an authentication result indicating whether the authentication was successful or failed. As noted above, such an authentication result may be used, for example, to grant use of key data 142 discussed above.

Figure 5:
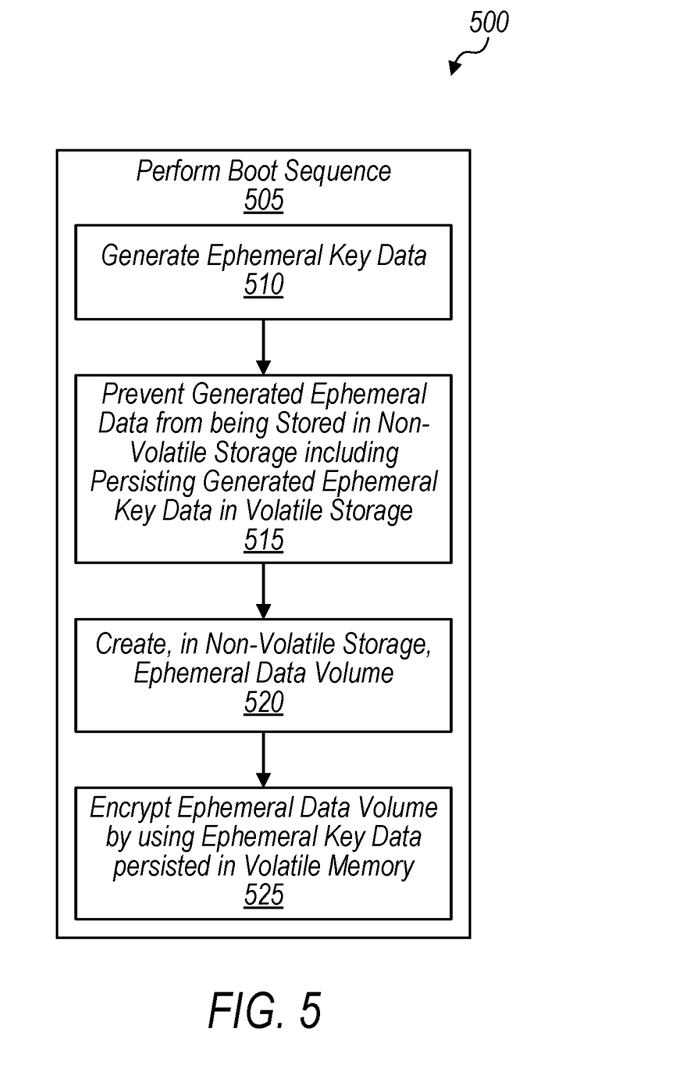
FIG. 5 is a flow diagram illustrating an example of a method, according to some embodiments.

Turning now to FIG. 5, a flow diagram of a method 500 is depicted. Method 500 is one embodiment of a method performed by computing system such as computing system 10. In some embodiments, steps 505-520 may be performed in a different order than shown and performance of steps 505-520 may also overlap in time (i.e., occur in parallel).

In step 505, the computing system performs a boot sequence (e.g., using bootloader 130).

In step 510, the boot sequence includes generating ephemeral key data (e.g., key data 142). In some embodiments, generating ephemeral key data includes generating only a single instance of the ephemeral key data.

In step 515, the boot sequence includes preventing the generated ephemeral key data from being stored in a non-volatile storage (e.g., non-volatile storage 120) including persisting the generated ephemeral key data in the volatile storage (e.g., volatile storage 140). In various embodiments, the volatile storage comprises a volatile memory and one or more registers included in circuitry coupled to the volatile memory. In some embodiments, prior to a use of the ephemeral key data, the computing system requests an authentication credential (e.g., authentication credential 402). In response to receiving the requested authentication credential, the computing system verifies the authentication credential and, in response to the verifying being successful, determines to permit the use of the ephemeral key data. In some embodiments, the authentication credential is a biometric credential (e.g., biometric credential 452).

In step 520, the boot sequence includes creating, in the non-volatile storage, an ephemeral data volume (e.g., data volume 122). In various embodiments, the computing system stores, in the non-volatile storage, an operating system volume (e.g., OS volume 302) that includes an operating system (e.g., OS 310) of the computing system, and the operating system volume is distinct from the ephemeral data volume. In some embodiments, the computing system receives data generated by the operating system after completion of the boot sequence and stores the data in the encrypted ephemeral data volume. In various embodiments, the ephemeral data volume is created each time the boot sequence is performed, and the operating system volume is preserved across multiple performances of the boot sequence. In some embodiments, the computing system verifies (e.g., via bootloader 130) an integrity of the operating system and, in response to the verifying failing, aborts the boot sequence without creating the ephemeral data volume.

In step 525, the boot sequence includes encrypting (e.g., via cryptographic module 150) the ephemeral data volume by using the ephemeral key data persisted in the volatile storage. In some embodiments, the ephemeral key data includes an ephemeral cryptographic key, and the ephemeral data volume is encrypted with the ephemeral cryptographic key. In some embodiments, the computing system derives an ephemeral cryptographic key (e.g., ephemeral cryptographic key 214) from the ephemeral key data, and the ephemeral data volume is encrypted with ephemeral cryptographic key. In some embodiments, the computing system derives one or more additional keys from the ephemeral key data, and the one or more additional keys include an authentication key. In some embodiments, a first cryptographic circuit (e.g., cryptographic circuit 212) coupled to the volatile storage reads the ephemeral key data from the volatile storage and derives an ephemeral cryptographic key from the read ephemeral key data. In such an embodiment, the ephemeral data volume is encrypted using the ephemeral cryptographic key. In some embodiments, a secure circuit (e.g., SEP 210) that includes the volatile storage and the first cryptographic circuit prevents the one or more processors from accessing the volatile storage and the first cryptographic circuit. In some embodiments, a second cryptographic circuit (e.g., cryptographic circuit 232) receives the derived ephemeral cryptographic key from the first cryptographic circuit and encrypts the ephemeral data volume using the received ephemeral cryptographic key. In some embodiments, a storage controller (e.g., storage controller 230) coupled to the non-volatile storage and including a cryptographic circuit receives data for storage in the encrypted data volume, encrypts the received data with the cryptographic circuit and using the ephemera key data, and stores the encrypted data in the encrypted data volume. In some embodiments, the ephemeral data volume is encrypted without the one or more processors receiving the ephemeral key data (e.g., using secure channel 220).

Exemplary Computer System

Figure 6:
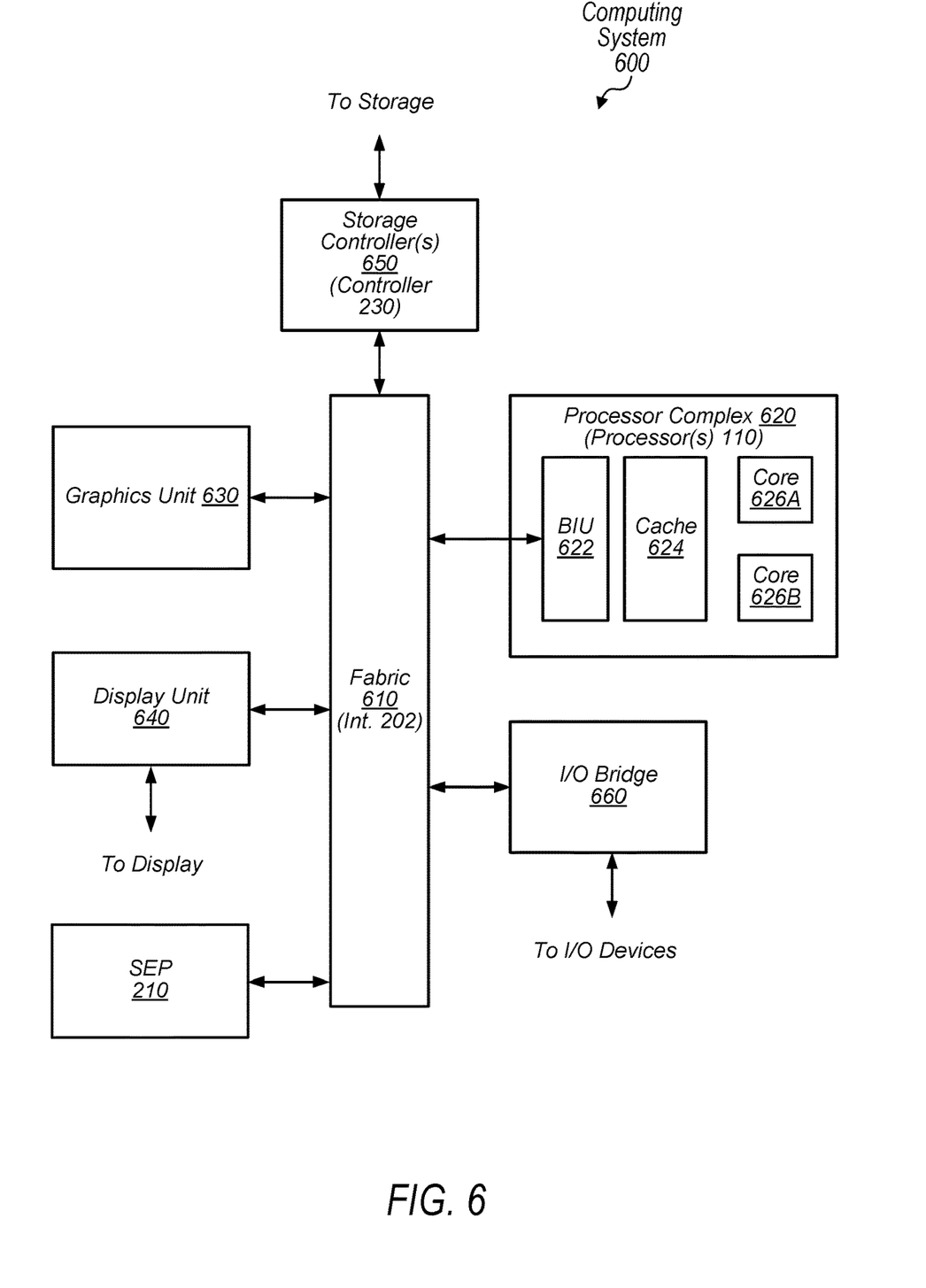
FIG. 6 is a block diagram illustrating an exemplary computing system, according to some embodiments.

Turning now to FIG. 6, a block diagram illustrating an exemplary embodiment of a computing system 600, which may implement functionality of computing system 10, is shown. System 600 may correspond to any suitable computing system such as a server system, personal computer system, desktop computer, laptop or notebook computer, mainframe computer system, tablet computer, handheld computer, workstation, network computer, a mobile phone, music player, personal data assistant (PDA), wearable device, internet of things (IoT) device, etc. In the illustrated embodiment, system 600 includes fabric 610, processor complex 620, graphics unit 630, display unit 640, cache/memory/storage controller 650, input/output (I/O) bridge 660. In the illustrated embodiment, computing system 600 further includes SEP 210 coupled to fabric 610. In some embodiments, elements of system 600 may be included within a system on a chip (SOC). In other embodiments, computing system 600 may be implemented differently than shown.

Fabric 610 may include various interconnects, buses, MUX's, controllers, etc., and may be configured to facilitate communication between various elements of system 600. In some embodiments, portions of fabric 610 may be configured to implement various different communication protocols. In other embodiments, fabric 610 may implement a single communication protocol and elements coupled to fabric 610 may convert from the single communication protocol to other communication protocols internally. As used herein, the term "coupled to" may indicate one or more connections between elements, and a coupling may include intervening elements. For example, in FIG. 6, graphics unit 630 may be described as "coupled to" a memory through fabric 610 and cache/storage controller 650. In contrast, in the illustrated embodiment of FIG. 6, graphics unit 630 is "directly coupled" to fabric 610 because there are no intervening elements. In some embodiments, fabric 610 may correspond to (or implement functionality of) interconnect 202 discussed above with FIG. 2.

In the illustrated embodiment, processor complex 620, which may implement processors 110 discussed above, includes bus interface unit (BIU) 622, cache 624, and cores 626A and 626B. In various embodiments, processor complex 620 may include various numbers of processors, processor cores and/or caches. For example, processor complex 620 may include 1, 2, or 4 processor cores, or any other suitable number. In one embodiment, cache 624 is a set associative L2 cache. In some embodiments, cores 626A and/or 626B may include internal instruction and/or data caches. In some embodiments, a coherency unit (not shown) in fabric 610, cache 624, or elsewhere in system 600 may be configured to maintain coherency between various caches of system 600. BIU 622 may be configured to manage communication between processor complex 620 and other elements of system 600. Processor cores such as cores 626 may be configured to execute instructions of a particular instruction set architecture (ISA), which may include operating system instructions and user application instructions. These instructions may be stored in computer readable medium such as a memory coupled to storage controller 650 discussed below.

Graphics unit 630 may include one or more processors and/or one or more graphics processing units (GPU's). Graphics unit 630 may receive graphics-oriented instructions, such as OPENGL®, Metal, or DIRECT3D® instructions, for example. Graphics unit 630 may execute specialized GPU instructions or perform other operations based on the received graphics-oriented instructions. Graphics unit 630 may generally be configured to process large blocks of data in parallel and may build images in a frame buffer for output to a display. Graphics unit 630 may include transform, lighting, triangle, and/or rendering engines in one or more graphics processing pipelines. Graphics unit 630 may output pixel information for display images.

Display unit 640 may be configured to read data from a frame buffer and provide a stream of pixel values for display. Display unit 640 may be configured as a display pipeline in some embodiments. Additionally, display unit 640 may be configured to blend multiple frames to produce an output frame. Further, display unit 640 may include one or more interfaces (e.g., MIPI® or embedded display port (eDP)) for coupling to a user display (e.g., a touchscreen or an external display).

Cache/memory/storage controller(s) 650 may be configured to manage transfer of data between fabric 610 and one or more caches and/or memories. For example, storage controller 650 may be coupled to an L3 cache, which may in turn be coupled to a system memory. In other embodiments, storage controller 650 may be directly coupled to a memory. In some embodiments, storage controller 650 may include one or more internal caches. storage coupled to controller 650 may be any type of volatile storage, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR4, etc.), RAMBUS DRAM (RDRAM), static RAM (SRAM), etc. In some embodiments, this volatile storage may correspond to volatile storage 140 discussed above. One or more memory devices may be coupled onto a circuit board to form memory modules such as single inline memory modules (SIMMs), dual inline memory modules (DIMMs), etc. Alternatively, the devices may be mounted with an integrated circuit in a chip-on-chip configuration, a package-on-package configuration, or a multi-chip module configuration. Memory coupled to a controller 650 may be any type of non-volatile memory such as NAND flash memory, NOR flash memory, nano RAM (NRAM), magneto-resistive RAM (MRAM), phase change RAM (PRAM), Racetrack memory, Memristor memory, etc. In some embodiments, this non-volatile memory may correspond to non-volatile storage 120 coupled to storage controller 230 discussed above. As noted above, this memory may store program instructions executable by processor complex 620 to cause system 600 to perform functionality described herein.

I/O bridge 660 may include various elements configured to implement universal serial bus (USB) communications, security, audio, and/or low-power always-on functionality, for example. I/O bridge 660 may also include interfaces such as pulse-width modulation (PWM), general-purpose input/output (GPIO), serial peripheral interface (SPI), and/or inter-integrated circuit (I2C), for example. Various types of peripherals and devices may be coupled to system 600 via I/O bridge 660. For example, these devices may include various types of wireless communication (e.g., Wi-Fi™, Bluetooth®, cellular, global positioning system, etc.), additional storage (e.g., RAM storage, solid state storage, or disk storage), user interface devices (e.g., keyboard, microphones, speakers, etc.), etc.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

The present disclosure includes references to "an embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to (or "constructed to") perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. A computing system, comprising:
one or more processors;
volatile storage; and
one or more computer readable media having program instructions stored therein that are executable by the one or more processors to cause the computing system to perform operations including:
performing a boot sequence of the computing system, the boot sequence includes:
generating ephemeral key data;
preventing the generated ephemeral key data from being stored in a non-volatile storage including persisting the generated ephemeral key data in the volatile storage;
creating, in the non-volatile storage, an ephemeral data volume that is accessible only during a current boot session; and
encrypting the ephemeral data volume by using the ephemeral key data persisted in the volatile storage;
wherein the preventing and the encrypting prevents the ephemeral data volume from being further accessible after a restart of the computing system.

2. The computing system of claim 1, wherein the volatile storage comprises a volatile memory and one or more registers included in circuitry coupled to the volatile memory.

3. The computing system of claim 1, wherein the ephemeral key data includes an ephemeral cryptographic key; and
wherein the ephemeral data volume is encrypted with the ephemeral cryptographic key.

4. The computing system of claim 1, wherein the operations further include:
deriving an ephemeral cryptographic key from the ephemeral key data, wherein the ephemeral data volume is encrypted with ephemeral cryptographic key.

5. The computing system of claim 4, wherein the operations further include:
deriving one or more additional keys from the ephemeral key data, wherein the one or more additional keys include an authentication key.

6. The computing system of claim 1, wherein generating the ephemeral key data includes generating only a single instance of the ephemeral key data.

7. The computing system of claim 1, further comprising:
a first cryptographic circuit coupled to the volatile storage, wherein the first cryptographic circuit is configured to:
read the ephemeral key data from the volatile storage; and
derive an ephemeral cryptographic key from the read ephemeral key data, wherein the ephemeral data volume is encrypted using the ephemeral cryptographic key.

8. The computing system of claim 7, further comprising:
a secure circuit that includes the volatile storage and the first cryptographic circuit, wherein the secure circuit is configured to:
prevent the one or more processors from accessing the volatile storage and the first cryptographic circuit.

9. The computing system of claim 7, further comprising:
a second cryptographic circuit configured to:
receive the derived ephemeral cryptographic key from the first cryptographic circuit; and
encrypt the ephemeral data volume using the received ephemeral cryptographic key.

10. The computing system of claim 1, further comprising:
a storage controller coupled to the non-volatile storage and including a cryptographic circuit, wherein the storage controller is configured to:

receive data for storage in the encrypted data volume;

encrypt the received data with the cryptographic circuit and using the ephemeral key data; and storing the encrypted data in the encrypted data volume.

11. A non-transitory computer readable medium having program instructions stored therein that are executable by a computing system to cause the computing system to perform operations comprising:

performing a boot sequence of the computing system, the boot sequence includes:

generating ephemeral key data;

preventing the generated ephemeral key data from being stored in a non-volatile storage including persisting the generated ephemeral key data in a volatile storage that is accessible only during a current boot session;

creating, in the non-volatile storage, an ephemeral data volume; and encrypting the ephemeral data volume by using the ephemeral key data persisted in the volatile storage;

wherein the preventing and the encrypting prevents the ephemeral data volume from being further accessible after a restart of the computing system.

12. The computer readable medium of claim 11, wherein the program instructions are executable by one or more processors of the computing system, and wherein the ephemeral data volume is encrypted without one or more processors receiving the ephemeral key data.

13. The computer readable medium of claim 11, wherein the operations further include:

prior to a use of the ephemeral key data:

requesting an authentication credential;

in response to receiving the requested authentication credential, verifying the authentication credential; and in response to the verifying being successful, determining to permit the use of the ephemeral key data.

14. The computer readable medium of claim 13, wherein the authentication credential is a biometric credential.

15. The computer readable medium of claim 11, wherein the operations further include:

storing, in the non-volatile storage, an operating system volume that includes an operating system of the computing system, wherein the operating system volume is distinct from the ephemeral data volume.

16. The computer readable medium of claim 15, wherein the operations further include:

receiving data generated by the operating system after completion of the boot sequence; and storing the data in the encrypted ephemeral data volume.

17. The computer readable medium of claim 15, wherein the ephemeral data volume is created each time the boot sequence is performed, and wherein the operating system volume is preserved across multiple performances of the boot sequence.

18. The computer readable medium of claim 15, wherein the program instructions that are executable to cause the computing system to perform persisting the generated ephemeral key data in the volatile storage include program instructions in the operating system.

19. The computer readable medium of claim 18, wherein the operations further include:

verifying an integrity of the operating system; and in response to the verifying failing, aborting the boot sequence without creating the ephemeral data volume.

20. A method, comprising:

performing, by a computing system, a boot sequence of the computing system, the boot sequence includes:

generating ephemeral key data;

preventing the generated ephemeral key data from being stored in a non-volatile storage including persisting the generated ephemeral key data in a volatile storage of the computing system;

creating, in the non-volatile storage, an ephemeral data volume that is accessible only during a current boot session; and encrypting the ephemeral data volume by using the ephemeral key data persisted in the volatile storage;

wherein the preventing and the encrypting prevents the ephemeral data volume from being further accessible after a restart of the computing system.

\* \* \* \* \*